US008818877B2

(12) United States Patent
Blanchard, Jr. et al.

(10) Patent No.: US 8,818,877 B2
(45) Date of Patent: Aug. 26, 2014

(54) PRESENTING COMPATIBLE COMPONENTS AND SYSTEM CONDITIONS FOR COMPUTER DEVICES

(75) Inventors: Richard Blanchard, Jr., Sonoma, CA (US); Himanshu Gupta, Campbell, CA (US); Steven P. Jobs, Palo Alto, CA (US); Howard A. Miller, Saratoga, CA (US); Michael B. Shebanek, San Jose, CA (US); Brian R. Smiley, Palo Alto, CA (US); Ralph E. Zazula, Mt. View, CA (US)

(73) Assignee: Apple Inc., Cupertino, CA (US)

( * ) Notice: Subject to any disclaimer, the term of this patent is extended or adjusted under 35 U.S.C. 154(b) by 1842 days.

(21) Appl. No.: 11/202,732

(22) Filed: Aug. 12, 2005

(65) Prior Publication Data

US 2006/0242030 A1    Oct. 26, 2006

Related U.S. Application Data

(63) Continuation-in-part of application No. 11/114,327, filed on Apr. 25, 2005, now Pat. No. 8,121,901.

(51) Int. Cl.
*G06Q 30/00* (2012.01)
(52) U.S. Cl.
USPC .......................................................... 705/26.1
(58) Field of Classification Search
USPC .......................................... 705/26, 27, 26.1
See application file for complete search history.

(56) References Cited

U.S. PATENT DOCUMENTS

| | | | |
|---|---|---|---|
| 6,363,359 B1 * | 3/2002 | Gronemeyer et al. | 705/28 |
| 6,820,064 B1 * | 11/2004 | Currans et al. | 705/77 |
| 6,937,999 B1 * | 8/2005 | Haines et al. | 705/26 |
| 6,963,851 B1 | 11/2005 | Szabo et al. | |
| 7,031,933 B2 | 4/2006 | Harper | |
| 7,062,451 B1 * | 6/2006 | Dentel et al. | 705/26 |
| 7,130,814 B1 | 10/2006 | Szabo et al. | |
| 2006/0238797 A1 | 10/2006 | Berglin | |

OTHER PUBLICATIONS

Ray, Ramon, "Dell's Recipe," Smallbizztechnology.com, Jul. 1, 2003.
Said, Carolyn, "Ink, Inc.," San Francisco Chronicle, Technology and Business, Jul. 26, 2004.
Xerox CentreWare Internet Services, Phaser 6250, E-Supplies Settings Screens, Xerox Corporation, 2003.
Xerox Office Products, Xerox Printers & Supplies, Phaser 6250, Xerox Corporation, 1999-2005.
HP SureSupply, Small & Medium Business Online Store, Hewlett-Packard Development Company, L.P., 2005.
HP Color LaserJet 9500 Device Status Screen, Hewlett-Packard Company, printed Jun. 13, 2005.

\* cited by examiner

*Primary Examiner* — Mila Airapetian
(74) *Attorney, Agent, or Firm* — Novak Druce Connolly Bove + Quigg LLP

(57) ABSTRACT

Presenting system and device conditions and purchasing options for components compatible with hardware devices of a computer system. In one aspect, an operating system determines the identity of a hardware device in communication with the operating system, communicates over a network to receive current purchasing information related to the hardware device, and displays components that can be selected for purchase and used with the hardware device. Another aspect provides a selectable user interface control for display in a graphical user interface that indicates a new operating condition of the computer system, different from a prior operating condition, by displaying a different appearance of the control. One embodiment has a new operating condition occurring when a component of a hardware device is within a predetermined threshold of requiring replacement, refilling, or supplementation.

47 Claims, 9 Drawing Sheets

PRESENTING COMPATIBLE COMPONENTS AND SYSTEM CONDITIONS FOR COMPUTER DEVICES

CROSS-REFERENCE TO RELATED APPLICATIONS

The present patent application is a continuation-in-part of patent application Ser. No. 11/114,327, filed Apr. 25, 2005 now U.S. Pat. No. 8,121,901, entitled, "Method and Apparatus for Providing Compatible Components for Purchase," which is incorporated herein by reference in its entirety.

FIELD OF THE INVENTION

The present invention relates to presenting compatible components and system conditions for computer devices, and more particularly to informing the user of system and hardware device conditions and providing options to purchase components compatible with particular hardware devices of a computer system.

BACKGROUND OF THE INVENTION

Computer systems can include or be connected to a number of hardware devices to provide additional functionality for the user. For example, printer devices provide hard copy output for the computer system on paper or other media. Other devices can be connected to computer systems to store or receive data, such as digital camera devices that allow the transfer of photo information between device and computer system, or iPod® music devices from Apple Computer, Inc., that allow music data to be transferred between device and computer system. Some hardware devices are usually physically included within the computer's housing, such as hard drives, a video card, a motherboard, etc.

Some hardware devices must be maintained or serviced, or components for the hardware device replaced when those components are at the end of their usable life. For example, printer devices require additional components, such as sheets of paper that are refilled in the storage tray of the printer when the currently-loaded sheets are all used. Likewise, ink cartridges or toner cartridges must be replaced with new cartridges when their existing supply runs out. Other hardware devices may have different components that need replacement or supplementation, e.g., batteries for a portable hardware device, memory or storage space for a motherboard hardware device, etc.

When a user wishes to purchase replacement or supplemental components or products for a hardware device, he or she can purchase the desired products online by connecting to a store website over the World Wide Web. Manufacturers or vendors can offer the products from the store website by allowing customers who access the website to select particular desired products for purchase. The customer can typically select particular brands, models, colors, quantities, or other characteristics of products to obtain the exact product the customer desires, which is delivered to the customer after purchase.

A disadvantage of the current methods for obtaining replacement or supplemental components for hardware devices is that the consumer must find out the particular brand, model, or other details of each replacement component that the consumer needs. For example, when buying another ink cartridge for a printer device, the user must know the exact printer model or series with which the cartridge is to be used. This can be confusing for consumers when hardware devices and product names are continuously being changed and new devices and components are continuously being made available by manufacturers. Some device drivers may be able to connect to a store website and allow the purchase of products, but such functionality is very specific to particular devices. In addition, current methods may not dependably alert and inform the user of the need to purchase new components for hardware devices or the current status of hardware device components.

Accordingly, what is needed is an apparatus and method for conveniently and automatically offering appropriate replacement or supplemental components for the particular hardware devices of a consumer's computer system, as well providing information to the user indicating the need for purchasing such components and other system conditions. The present invention addresses such a need.

SUMMARY OF THE INVENTION

The invention of the present application relates to presenting compatible components of computer devices for purchase and presenting the user with system and hardware device conditions. In one aspect of the invention, a method for allowing the purchase of components for a hardware device using a computer system includes using an operating system on the computer system to automatically determine the identity of a hardware device coupled to the computer system and in communication with the operating system. The method communicates over a network to receive current purchasing information from a server at the computer system related to the hardware device, and displays on the computer system at least one component for the hardware device based on the identity of the hardware device when a user selects a purchase option provided and displayed by the operating system. A user can select the at least one component for purchase, where the at least one component is compatible with and for use with the hardware device. Similar aspects of the invention provide a computer readable medium for implementing similar features.

In another aspect of the invention, a computer-implemented method for allowing the purchase of components for a hardware device includes receiving a selection from a user of a purchase option control displayed in an operating system running on a computer system, and using the identity of a hardware device coupled to the computer system and in communication with the operating system to receive current purchasing information at the computer system related to the hardware device. The identity of the hardware device is determined based on device information collected by the operating system from the hardware device. At least one component for the hardware device is displayed on the computer system based on the identity of the hardware device such that a user can select and purchase the at least one component, where the component is compatible with and for use with the hardware device.

In another aspect of the invention, a method for providing a user interface element for display on a computer system includes displaying a control in a graphical user interface, the control being selectable by a user, where the control can be displayed as having a first appearance or a second appearance to indicate one of two corresponding possible states. A new operating condition of the computer system, different from a prior operating condition, is indicated by displaying the appearance of the control as a third appearance when the new operating condition occurs and while the new operating condition exists, where the third appearance of the control is different from the first and second appearances of the control.

In another aspect of the invention, a method for providing a user interface element for display on a computer system includes displaying a button in a graphical user interface, the button being selectable by a user, and changing the appearance of the button when at least one component of a hardware device in communication with the computer system is within a predetermined threshold of requiring replacement, refilling, or supplementation.

The present invention provides a method and system that allows a user to quickly and conveniently purchase components compatible with hardware devices of that user's computer system, in order to resupply exhausted components or replace existing components, using a minimum of effort. Furthermore, the present invention can provide helpful information to assist the user in determining system conditions, such as the need for purchasing components or status of existing components, and in deciding what components to purchase and when to do so.

DETAILED DESCRIPTION

The present invention relates to presenting compatible components and system conditions for computer devices, and more particularly to informing the user of system and hardware device conditions and providing options to purchase components compatible with particular hardware devices of a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1 through 6 in conjunction with the discussion below.

Figure 1:
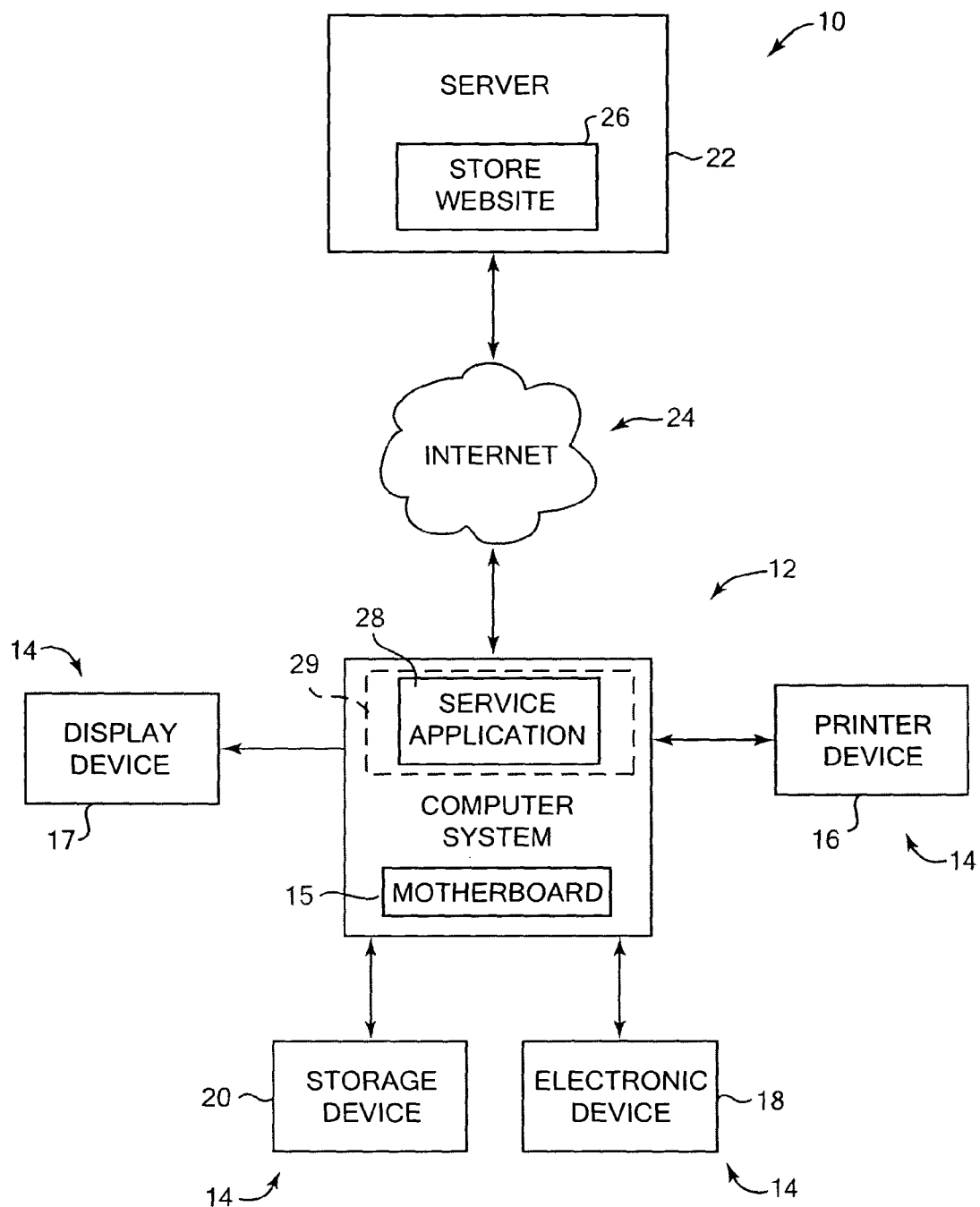
FIG. 1 is a block diagram illustrating a system suitable for use with the present invention.

FIG. 1 is a block diagram of an example of a system 10 suitable for use with the present invention.

System 10 includes a computer system 12, which can be any suitable computer or electronic device which can communicate across computer networks and control one or more peripheral hardware devices. For example, computer system 12 can be a desktop computer system such as one available from Apple Computer, Inc., or other brand or make of computer. Alternatively, computer system 12 can be a server, workstation, consumer electronic device, laptop or other portable computer, personal digital assistant (PDA), cell phone, game device, or other electronic device. In the typical embodiment, a operating system runs on the computer system 12, and application programs and driver programs running alongside or under the operating system, as is well known to those of skill in the art.

A number of hardware devices 14 are included in or communicate with the computer system 12 such that commands and/or data can be transferred between the computer system 12 and the devices 14. A hardware device 14 may use one or more components, compatible with that hardware device, which must be replaced or supplemented when those components are exhausted, obsolete, or fully used.

Computer system 12 can include a number of internal hardware devices 14 which are typically provided within the housing of the computer system. Such hardware devices include a main motherboard 15, to which components such as a microprocessor, memory (RAM and/or ROM), interface components, and the like are coupled.

Other internal hardware devices can include such devices as a hard drive 20 for storage of data, or a video card for processing and providing data for display on a display device (such as device 17). For example, a hardware device 14 such as hard drive or other storage device 20 can be used for the computer system 12 and need replacement or supplementation, e.g., a hard drive device that is nearly full of data, up to its capacity, and which can be supplemented or replaced with another hard drive that is purchased using the present invention. Thus, herein, a device can both be considered a "hardware device" as well as a "component" for a different hardware device. For example, the motherboard 15, or the computer system 12 itself, can be considered a "hardware device" having compatible "components" such as a microprocessor, memory, or a hard drive 20 which may need to be replaced or supplemented. In addition, the hard drive 20 can itself be considered a "hardware device" which may have compatible components, such as a ribbon cable, mounting, etc., which can be replaced or supplemented.

Hardware devices 14 can also include external or peripheral devices. For example, one commonly-used hardware device 14 is printer device 16 which outputs text and images on physical media such as paper. Printer device 16 can be any type of printer, including an inkjet printer, laser printer, thermal printer, plotter, etc.

For example, printer device 16 uses a component such as a fixed supply of print media, such as paper, which must be refilled or replaced with new supply when the supply has been completely used and output. In addition, printer device 16 uses components such as one or more "cartridges" of print material to write images on the paper or other print media. For example, an inkjet printer uses one or more ink cartridges, while a laser printer uses one or more toner cartridges. When the ink or toner in a cartridge runs out, the cartridge must be replaced with a new, full cartridge. A display device 17 is another peripheral hardware device that displays information to the user of the computer system 12.

Herein, the term "components" refers to supplies and mechanisms, such as paper or cartridges, which run out and must be replaced or refilled. Components can also refer to mechanical parts of a hardware device which can be replaced if those parts malfunction or wear out, e.g., an image drum or fuser of a laser printer. In addition, components may refer to memory or storage space (e.g., on a hard drive) or other limited resource, which can be consumed (e.g., filled up) over time and use and thus require supplementation with additional memory or storage space, or replacement with an item that provides more memory or storage space. For example, the components can be accessories, such as products which supplement the use of existing components. Any component of a hardware device which must be periodically refilled, replaced or supplemented can be used with the present invention, e.g., ink/toner in cartridges or waster toner buckets, mechanical parts, or water or other refillables in a printing press hardware device.

Other hardware devices 14 can also be connected to the computer system 12. For example, an electronic device 18 can interface with the computer 12, such as a digital camera or an audio playback device (e.g., an iPod® portable electronic device from Apple Computer, Inc.), to send data to or receive data from the computer system. Such an electronic device 18 might have a component that can be expended, similar to the printer paper or print material, or filled up, and need to be replaced or supplemented. For example, batteries on the device 18 might be nearing the end of their useful life and need to be replaced. Or, memory on the electronic device 18 might be found to be full and need to be supplemented with additional memory.

Computer system 12 can connect to a server system 22 over a computer network 24. In the example shown, network 24 is the Internet and World Wide Web, but can be other types of networks in other embodiments (e.g., a local area network (LAN), wide area network, cell phone communication link, etc.). Server system 22 is a computer system that provides a store website 26 that is available to computer system 12 or any other computer system connecting to the server.

Store website 26 presents selections for a user to purchase replacement or supplemental components for the hardware devices 14 of the user's computer system 12. In one embodiment of the present invention, the computer system 12 runs a purchase application 28 that provides information to the store website 26 so that the server 22 can know what hardware device(s) 14 are connected to the particular computer system 12. In a preferred embodiment, the purchase application 28 is included or incorporated in an operating system 29 running on the computer system 12, allowing any hardware device which the operating system can communicate with to be recognized and provided with the buying functionality described herein. With the information provided, the server 22 automatically determines one or more hardware devices of the computer system 12 and displays the appropriate components to that hardware device for the user to select. Other embodiments may allow the computer system 12 to determine the hardware devices 14 and present appropriate components. These embodiments are described in greater detail below. The user can select the desired components from those presented and purchase these components via the store website 26, e.g., using a standard transaction method such as credit card, debit card, account, loans, or other purchasing method. The purchased components can then be delivered to the user from an organization managing (or otherwise in association with) the website 26.

Figure 2A:
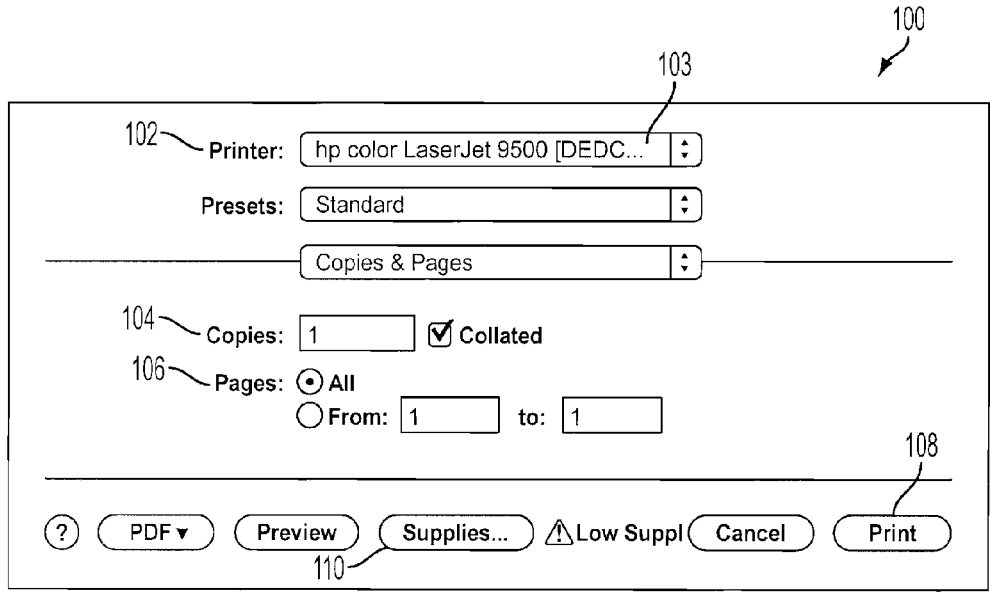
FIGS. 2A-F are diagrammatic illustrations of displays of a computer system that are suitable for informing the user of system conditions and allowing the user to select to purchase device components according to the present invention.

FIG. 2A is a diagrammatic illustration of an example of a print panel 100 that is displayed to the user of computer system 12 on display device 13 and which offers the user the option to purchase components related to hardware devices 14, specifically printer device 16, from the store website 26. Print panel 100 can be displayed when the user selects a "print" option or command in the operating system (or, e.g., in an application interface running under the operating system), in order to print a displayed document or other designated data.

In the example shown, panel 100 displays in field 102 the name of the particular printer device 16 for which information and options are being displayed. The user can select a different printer device in communication with computer system 12 by selecting from a drop-down menu 103 or other selection method, if multiple printer devices are available to the computer system 12. The print panel 100 shows typical options for the user such as number of copies to print 104, the pages to print 106, and the print button 108 to start the printing operation.

A buy button or supplies button 110 of the present invention is also displayed in panel 100 (labeled "Supplies" in the example shown). When this button is selected by the user, an application program of the computer system displays a number of compatible components for the printer device which can be purchased by the user. For example, a default web browser can be opened to display a page of the store website 26 received from server 22. In one described embodiment, the purchase application 28 sends data indicating the identity of the printer device 16 designated in field 102 to the server 22 so that components for purchase can be displayed on the page which are appropriate to and compatible with that printer device. An example of a displayed store website page is described below with reference to FIG. 3. In other embodiments, a different application program, such as a word processor, can display the list of components to purchase. In yet other embodiments, the computer system 12 uses previously-received database information to display compatible components.

In one preferred embodiment, the supplies button 110 can be provided as part of the functions of the operating system 29 running on the computer system 12. Thus, this purchasing functionality is available for all hardware devices that communicate with the operating system 29.

In other embodiments, the print panel 100 can be displayed automatically when a particular condition of the printer device 16 is met, without the user having to select a print option or make some other selection. For example, when one or more ink or toner levels of the printer device get to a very low level, e.g. under a predetermined threshold level, the panel 100 can be automatically displayed to allow the user to immediately select supplies button 110 to purchase one or more replacement cartridges.

Panels or similar displays can also be provided for other types of hardware devices 14 besides printer device 16. For example, a panel can be displayed that shows the battery charge level for one or more batteries in a connected device 14 such as a digital camera or audio playback device, or for one or more batteries in the computer system 12 (i.e., the hardware device would be the computer system 12). In one embodiment, the panel can display the number of recharge cycles left on a battery to help the user determine how much battery life is left, and/or display a bar graph similar to the ones shown in FIG. 2A to indicate the remaining life or time left in a battery. In another embodiment, the current available storage space for a component, such as a hard drive, RAM memory of the computer system 12, removable memory for an electronic device 18, etc., can be displayed as a percentage and/or graph in a panel, to help the user determine whether more storage capacity is needed. Prior user or device behavior can also be examined in such embodiments to determine predictive models, e.g., the average amount of daily use of a hard drive or battery, and data showing the average life of a similar hard drive or battery, can allow the panel to display an estimated useful life for the component or hardware device. In addition to or instead of displaying the predictive model's conclusion to the user, other messages can be displayed. For example, a purchase recommendation can be displayed for a new, similar component or hardware device, instead of stating the facts of the predictive model.

Figure 2B:
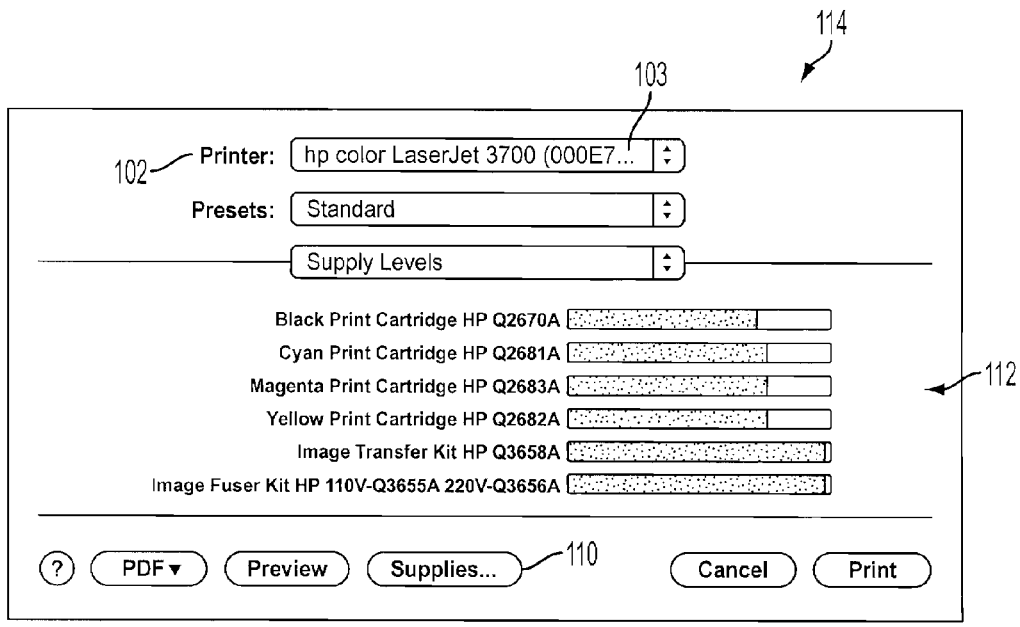

FIG. 2B is a diagrammatic illustration of another embodiment of a print panel 114 that offers the user the option to purchase components related to hardware devices 14 similar to panel 100 of FIG. 2A, and which offers additional status information. Panel 114 includes field 102, drop-down menu 103, and displays for number of copies to print 104, the pages to print 106, the print button 108, and a supplies button 110, similar to print panel 100.

Panel 114 also displays the status information 112, which describes the current status of exhaustible or consumable components of the hardware device indicated in field 102. The status information 112 can automatically be displayed whenever the print panel 114 is displayed. In other embodiments, the status information 112 can be displayed only when a predetermined condition is met, such as the user selecting a particular button or other control (not shown), or if the status of one or more of the components shown by the status information has passed a predetermined threshold, e.g., a toner or ink level for a printer cartridge below a predetermined percentage of full capacity.

In the example shown in FIG. 2B, status information 112 displays the current levels of toner as bar graphs for all the toner cartridge components of the printer device indicated in field 102, where each toner cartridge provides a different color of toner. From this information 112, the user can easily determine whether or not new toner cartridges should be bought for the printer device via the supplies button 110. In addition, the current status or level of other components of the printer device can be displayed as shown, such as an "image transfer kit" for the printer (including other parts for the printer), and a fuser component of the laser printer. In particular embodiments, any types of components and their current statuses can be displayed similarly, such as fillable components (e.g., waster toner buckets), or components that wear out (e.g., fusers or imaging drums).

Figure 2C:
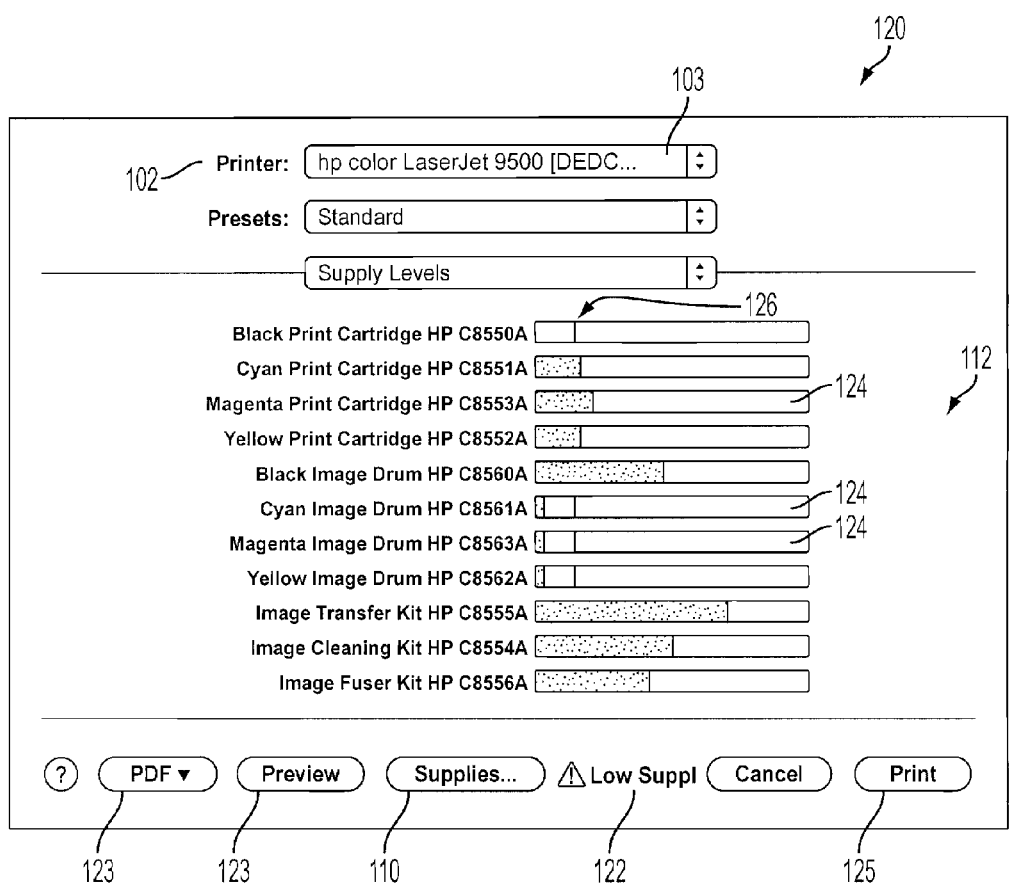

FIG. 2C is a diagrammatic illustration of another embodiment of a print panel 120 similar to panel 114 of FIG. 2B. Panel 120 displays print cartridge, image drum levels, and other component statuses 112 for the laser printer displayed in field 102.

In addition, to assist the user, a warning or message can be displayed in some embodiments to indicate to the user that a component is getting close to a point where it will need replacement, refilling or supplementation. The time at which to present the warning can be determined as a predetermined threshold of use of the component before it requires replacement, refilling, or supplementation. For example, a particular cartridge toner level or a battery charge may fall below a predetermined threshold level. In panel 120, a message 122 is displayed to indicate low supplies for at least one component of at least one hardware device in communication with the computer system. For example, once the toner level of a particular color falls to a threshold of 5% or lower of full capacity (such as the "Black" print cartridge and several image drums in panel 120), then the warning 122 can be displayed, so that the user knows that a new ink cartridge for that color should be purchased soon by selecting supplies button 110. All bar graphs 124 (or just the bar graphs for supplies below the threshold level) can include a designation 126 for the threshold level, below which the warning 122 will be displayed by the operating system.

In some embodiments of panel 120, the supplies button 110 can itself be displayed with an indicator or appearance that acts as a warning to the user that one or more components of the hardware device are at low levels or need replacement or supplementation (e.g., below a predetermined threshold level). For example, the supplies button 110 can be displayed or highlighted in a particular different color (e.g., yellow or red) as shown, or be displayed as flashing a color on and off, be displayed in a different shape, or be provided with some other indicator or appearance (outline, boldface letters, etc.). This warning appearance is different from other standard appearances that the button 110 could take in the operating system, so as to effectively warn the user. For example, standard graphical user interfaces often have one appearance to indicate "inactive" buttons, such as a gray color for buttons 123, and a second appearance to indicate an "active" button, such as a blue color for print button 125, which is considered a default button selection (and, for example, will be the button selected when a standard button such as an Enter key on a keyboard is pressed by the user). The present invention, however, presents a third appearance for a button, such as button 110, which is different from the other two appearances (e.g., a different color such as yellow), and which warns the user of a new system condition when and during the condition's occurrence.

Furthermore, in some embodiments, different warnings can be displayed to indicate the level or urgency based on different level thresholds, e.g., orange when toner is below 10% of capacity, and red when toner is below 5% of capacity. In other embodiments, a different activatable user interface element, such as a different button or other control, can be similarly highlighted or designated to indicate the status level of hardware device components.

The warning indicator for a selectable control element in a graphical user interface, such as displayed button 110 as shown in panel 120, can be used in alternate embodiments to indicate information concerning any operating condition of the computer system 12 (including an operating condition of software running on the computer, or a hardware device condition for a connected hardware devices 14) that differs from a prior condition of the computer system. For example, the new operating condition may be an error that occurs in the computer system or a hardware device, and the presence of this new error condition can be indicated to the user as a displayed indicator on a selectable control such as an icon, menu item, or button, that is different from the appearance of that control when the computer system is in a "normal," non-error condition. In the purchase supplies embodiments of the present invention, the new operating condition is for a hardware device condition in which an existing component of a hardware device has been used to the point where it is below a threshold capacity or lifespan and soon needs refilling, replacement, or supplementation, whereas the prior, "normal" operating condition of the computer system occurs when no existing components of the hardware device are within the predetermined thresholds of use.

This feature is greatly effective in relaying the new condition to the user, since the user does not normally see this change in appearance when reviewing and selecting the controls in the user interface; when such a change in appearance occurs, it is very noticeable. The change in appearance of the selectable control preferably is displayed when a new condition occurs, and as long as one or more new conditions exist.

In some embodiments, the selectable control having the changed appearance is itself related to the new operating condition which is being communicated to the user via the change in control appearance. The selectable control, by its function, can remedy the new operating condition, or at least indicate the type, description, or nature of the new condition. For example, the highlighting of the supplies button 110 in a different color warns the user that one or more hardware device components may be low, which can be alleviated by clicking on the button 110 and purchasing supplies or a replacement to remedy the condition. In another example, if one or more errors in a network are detected, then a control related to communicating over the network (such as a browser icon) can be displayed with an indicator to warn the user of this error. This indication and change in the appearance of the selectable control draws the user's attention to an existing selectable user interface control and relates to the user that selection of the control is more important than under normal, previous operating conditions, thus effectively warning the user of the new operating condition and hinting at the nature of and/or remedy to the operating condition with a small amount of information.

In alternate embodiments, an application program of computer system 12 (such as purchase program 28) can use a predictive model, i.e., perform a more detailed analysis of the prior behavior of the user of the computer system 12 and/or the printer device 16, to make a prediction of future use and estimation of when replacement or supplementary hardware device components will be needed. For example, the rate of toner use for the printer device 16 can be averaged over a predetermined time period, such as the last three months, to predict the time in the future when the toner will run out. This prediction can be displayed to the user as status information 112 to further assist the user's determination when to select button 110 to purchase new components or supplies. Alternatively, the prediction can be used to determine the appropriate time to alert the user, independently of the toner cartridge levels, e.g., alert the user when there is approximately two weeks left of use of the toner cartridge, as based on the predictive model. This alert can include the message 122 and/or indicator or highlighting on a selectable control such as supplies button 110. The alert time (before predicted exhaustion or failure of a component) can also be made adjustable or settable by the user.

Figure 2D:
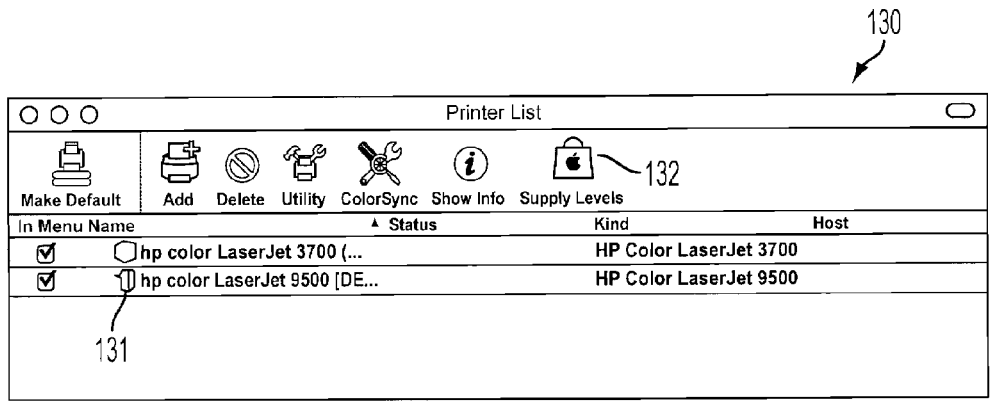

FIG. 2D is a diagrammatic illustration of a printer setup utility panel 130. Panel 130 can be displayed to the user of computer system 12 when the user selects to setup a printer on the computer system 12, or selects system preferences of the operating system on computer system 12 and a printer tab or option is selected from those preferences to display information about the selected type of device.

In panel 130, currently-connected printer devices are displayed in a list, and one of the printer devices 131 is highlighted as the currently selected printer device. The user can then select a "Supply Levels" button 132 to display the current level of use for the components of the selected printer device 131.

Figure 2E:
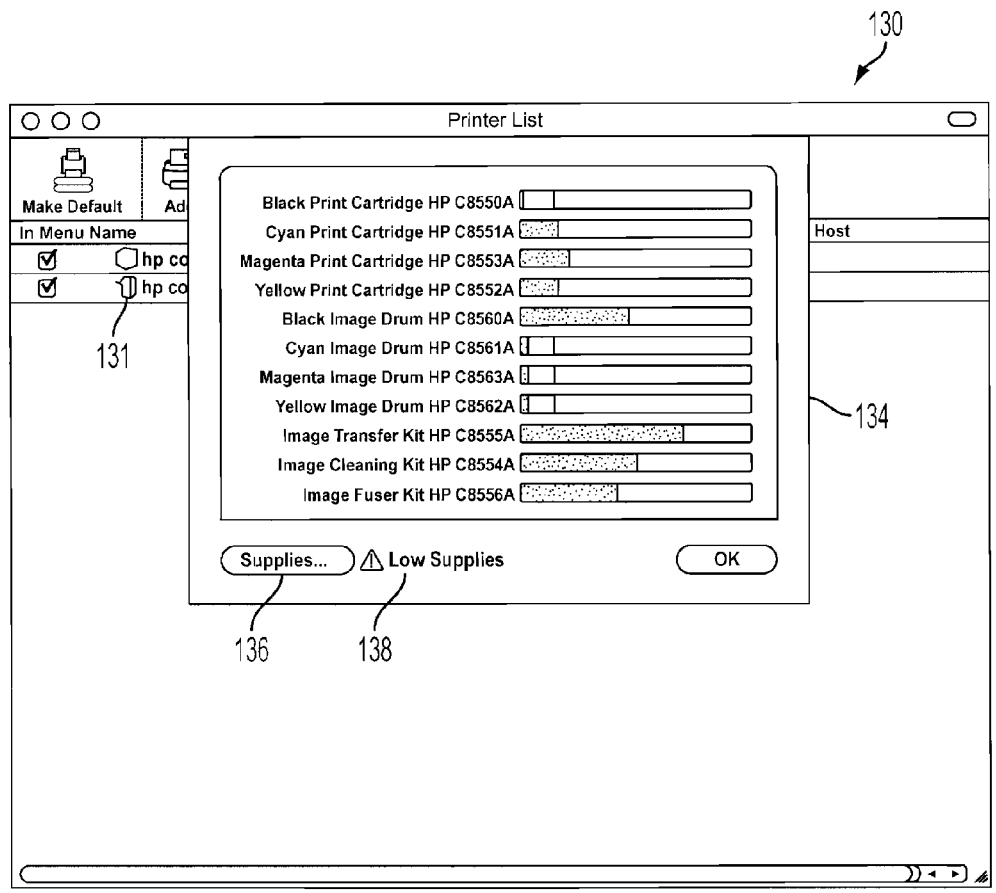

FIG. 2E is a diagrammatic illustration of the printer setup utility panel 130 after the user has selected supply level button 132. A new status panel 134 is displayed, showing status information such as the current toner and other component levels of the toner cartridges of the selected printer device 131. In addition, a supplies button 136 of the present invention is also displayed in panel 134 (labeled "Supplies" in the example shown). As with the examples of FIGS. 2A-C, when this button is selected by the user, an application program can display a number of compatible components for purchase for the selected printer device 131 from the store website 16. This is described in greater detail with respect to FIG. 4. In some embodiments, a warning indicator or message 138 can be displayed if any of the component levels are currently below a predetermined threshold level. This is similar to the warning message or indicator described above with reference to FIG. 2C.

Figure 2F:
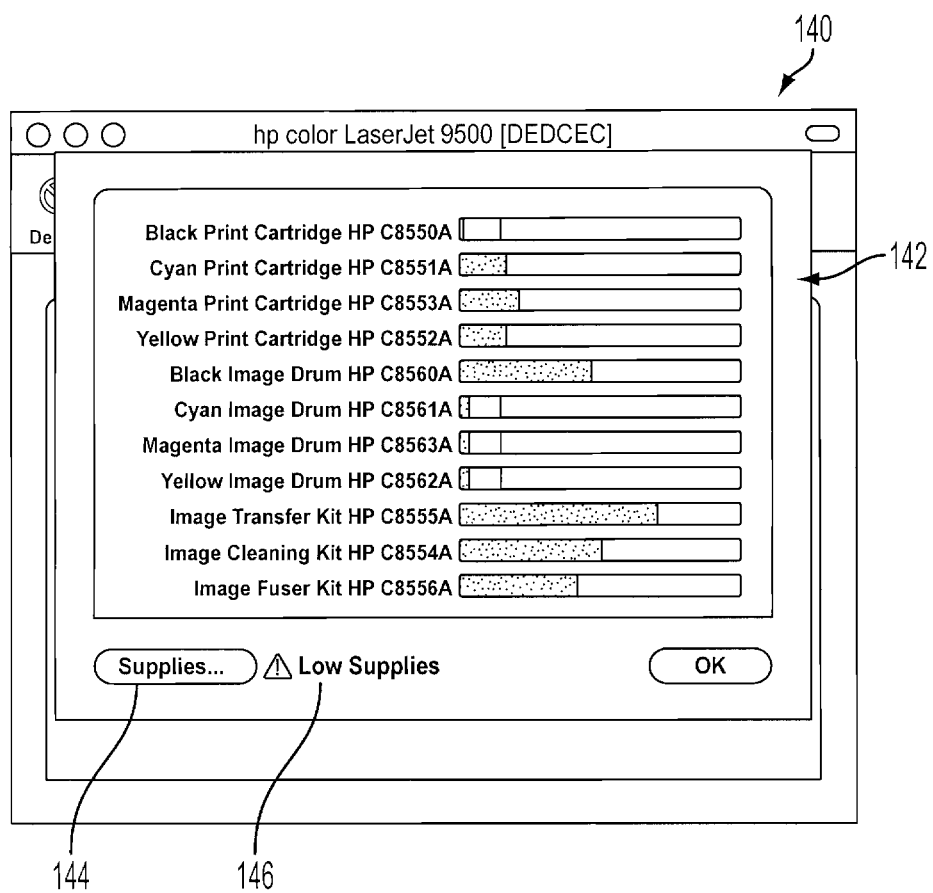

FIG. 2F is a diagrammatic illustration of a printer desktop panel 140 and status panel 142. Panel 140 can be displayed to the user of computer system 12 when the user selects a printer icon displayed on the desktop of the operating system graphical interface displayed to the user, that printer icon associated with a particular printer device controlled via the operating system. The panel 140 shows the current settings of the printer device.

The user can select a "Supply Levels" button (not shown), similar to the button 132 shown in FIG. 2D. In response to the selection, a status panel 142 is displayed, showing status information such as the current toner levels of the toner cartridges of the associated printer device. A supplies button 144 is also displayed in panel 142, causing the display a number of compatible components for purchase for the selected printer device 134 from the store website 16 similar to the supplies buttons described above. In some embodiments, a warning indicator or message 146 can be displayed if any of the component levels are currently below a predetermined threshold level, similar to the warning message described above with reference to FIG. 2C.

Figure 3:
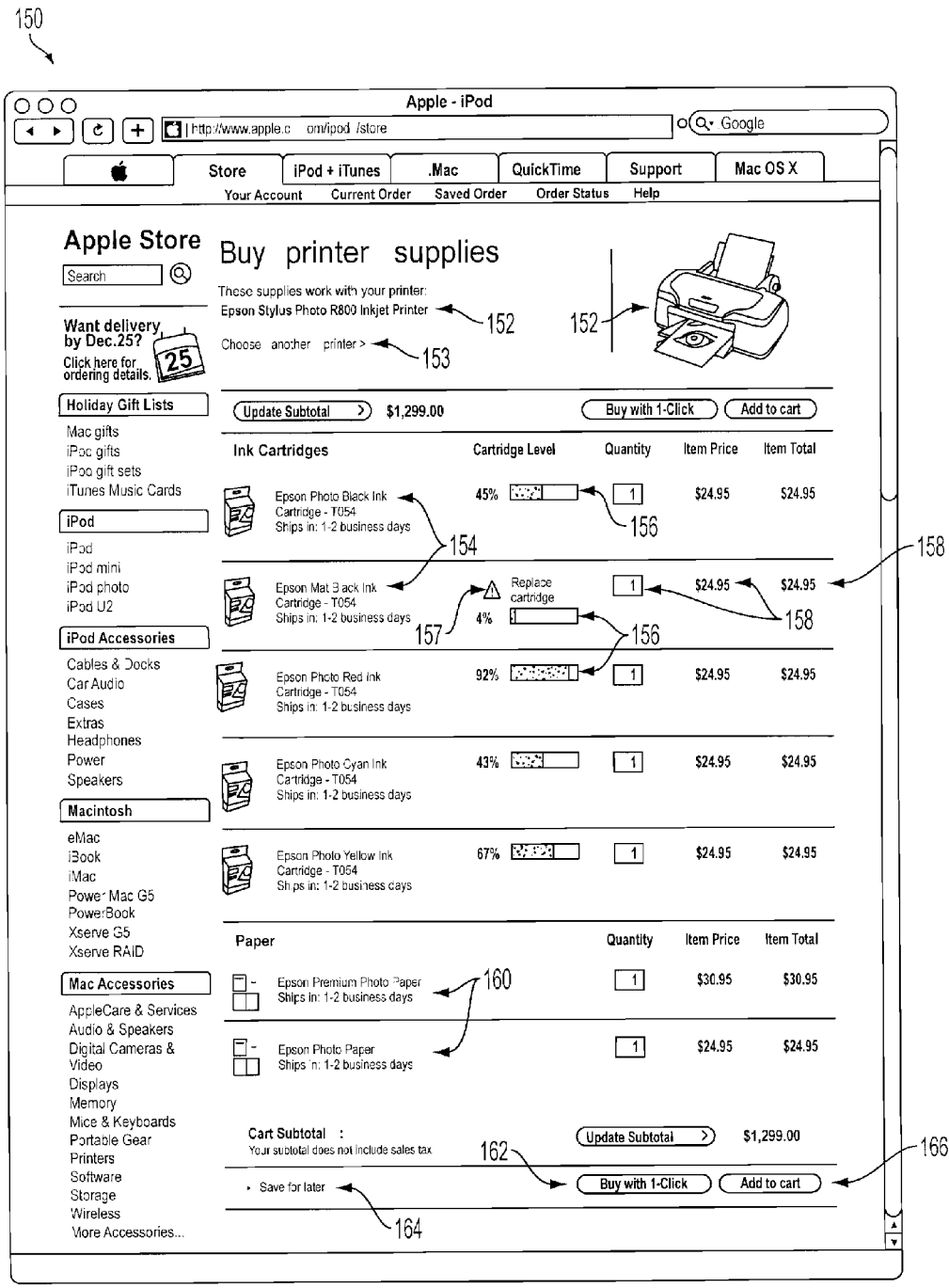
FIG. 3 is a diagrammatic illustration of an example of a purchase web page displayed after the user has selected to purchase components.

FIG. 3 is a diagrammatic illustration of an example of a purchase web page 150 of the store website 26, which is displayed on the computer system 12 after the user has selected the supplies button 110, 126, 136, or 144 as shown in FIGS. 2A-F. Purchase page 150 is preferably displayed in a web browser or other application program which can display data from web pages accessed over the Internet or other network.

Purchase page 150 includes printer identifications 152 to show the user which printer he or she is to purchase components for, and can include the text description of the model or series of the hardware device, and/or an image of the device. This identification was received by the website from the purchase application 28 on the client computer, as explained in greater detail below. In the described embodiment, if the identification 152 is not for the hardware device that the user wishes to buy components for, then the user can select a control, e.g., link 153, to cause a menu or list to be displayed which offers all the possible printer devices (and any other types of hardware devices, if desired) from which the user can select the desired device.

The compatible types of components available for the identified printer device 152 are also displayed in page 150, as well as any status information for components and other related descriptions, prices, etc. (collectively this is referred to herein as "component purchase information"). In this example, the first type of component/product displayed are ink cartridges 154 for an inkjet printer hardware device, where each available color and type of ink cartridge, and appropriate product names, are displayed. After each color or type of ink cartridge, the current ink level 156 is displayed for that type of cartridge as measured or estimated for the existing cartridge in the printer device 152 of the user's computer system 12. These can be the same ink or toner levels (or other status levels) as displayed on computer system 12 as shown in FIGS. 2A-F (if such an embodiment is being implemented).

In one embodiment, the purchase application 28 sends the ink status levels to the server 22 so that the ink levels 156 can be displayed in page 150. If an ink level is below a predetermined threshold, e.g., 5% of capacity, then a warning or other indicator 157 can be displayed to indicate to the user that this particular existing cartridge needs imminent replacement with a new cartridge. The page 150 also displays information 158 related to purchasing each ink cartridge, such as quantity, price per item, and total price, and can display other information in other embodiments, e.g., a short description of each component, list price, actual price, tax and shipping costs, savings achieved at the store website 26, promotions and advertisements, etc.

Purchase page 150 can also display other types of components that are compatible with or otherwise appropriate for the printer device indicated at 152, such as paper products 160. For example, types of paper that are offered by the manufacturer of the printer device 152 specifically for use with that device can be offered by the purchase page 150.

The user/customer can preferably select the desired components and indicate the quantity desired, and then select a control to purchase the selected items, such as supplies button 162. The money to purchase the item can then be debited from the user's account, charged to a credit or debit card, or a loan is instituted, etc., and the purchased components are delivered to the user. Other well-known features can also be included on page 150, such as saving an order with selection 164 before actually purchasing, adding items to a cart with button 166, and/or in other embodiments, adding items to a wish list, emailing purchase reminders to recipients, etc.

In some embodiments, the user can set up purchasing preferences which will automatically purchase needed components. For example, when the ink levels of the printer device's ink cartridges get to a predetermined, preferred level, the store page 150 can automatically be called up by the computer system 12 and a replacement ink cartridge purchased (although typically a user will want some consent before a purchase is made). In some embodiments, users can schedule recurring purchases to occur at the website 26. For example, ink cartridges can be ordered every N months or weeks, where N is a user-specified number. This can also be used with the predictive modeling described above such that a set of suggested scheduling times can be offered to the user for each component based on prior use of the component, from which an actual purchasing schedule is selected by the user.

In other embodiments, other types of hardware devices 14 can be the basis of the components offered by the purchase page 150. For example, for an audio playback device such as an iPod®, batteries, memory cards, or other accessories can be offered for purchase by the user.

In another embodiment, the store website is not received from the server 22 upon selection of the supplies button, but the computer system 12 displays component purchase information based on previously-received database data from server 22. This is described in greater detail below.

Figure 4:
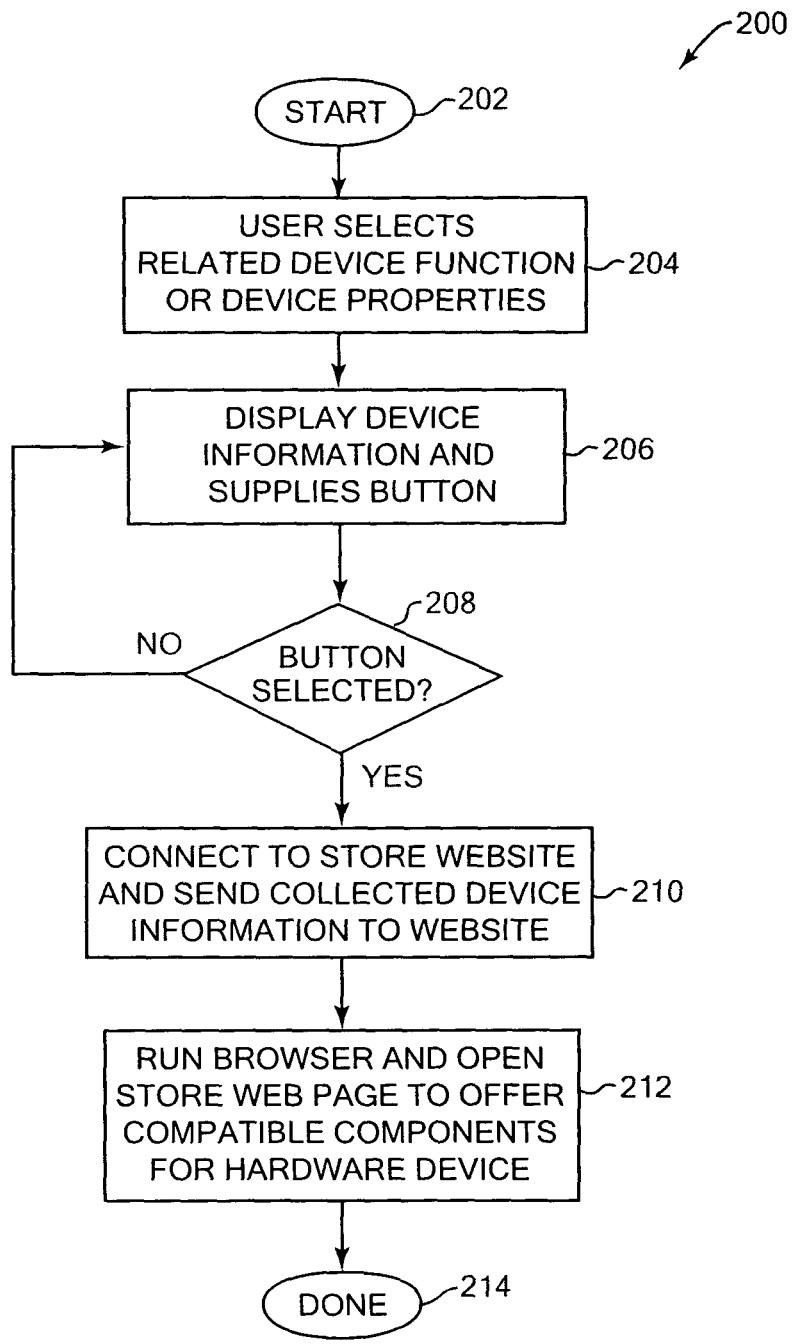
FIG. 4 is a flow diagram illustrating a method of the present invention for providing a user with an option to buy compatible components for a hardware device.

FIG. 4 is a flow diagram illustrating a method 200 of the present invention for providing a user with an option to buy compatible components for a hardware device of the computer system 12. Method 200 can be implemented by program instructions (software) in one or more applications running on the computer system 12. In alternate embodiments, method 200 can be run using hardware using logic gates, circuitry, etc., or a combination of software and hardware. Program instructions for method 200 can be stored on a computer readable medium, such as memory, hard drive, other magnetic disk, optical disk (CD-ROM, DVD-ROM), etc.

Method 200 begins at 202, and in step 204, the user of the computer system 12 selects a device function or device properties related to a hardware device 14 in communication with the computer system 12. For example, the user can select a print command from a drop down menu in a graphical user interface for an operating system, intending to print a document or other output from a connected printer device 16, as described with reference to FIGS. 2A-C. Or, the user can select a printer or other device from a printer setup utility or system properties screen displayed in the operating system, as described with reference to FIG. 2D, or a device desktop icon, as described with reference to FIG. 2F.

In step 206, device information is displayed, including a buy supplies button. For example, if the user selected a print menu item, then a print dialog box can be displayed as shown in FIGS. 2A-C, which includes supplies button 110. If the user selected a printer type of device in a printer setup utility or system properties screen, then the panels shown in FIGS. 2D-E can be displayed, including a supplies button 126, or if a device desktop icon is selected, then the panels of FIG. 2F can be displayed. In some embodiments, the current status levels of existing components in the selected hardware device can also be displayed, as well as any warnings or estimations based on prior user or device performance, as described above. In alternate embodiments, a supplies button similar to button 110, 126, 136, or 144 can always be displayed in an operating system or application running on the computer system 12.

In some embodiments, the display of the buy supplies button can suppressed if the computer system 12 is being operated in a location (e.g., country or region) where an online store for the hardware device does not have a presence and will not service customers, or if online stores servicing that location do not support the functionality of the present invention to allow components appropriate to a customer's hardware device to be offered. For example, the operating system or purchase application 28 of computer system 12 can receive periodic updates indicating whether online stores at that location are now compatible and thus if the supplies button should be displayed. (If the display of the supplies button is suppressed, then the method is complete at 206.)

In step 208, the process checks whether the buy supplies button displayed in step 206 has been selected by the user. As explained above, the user may want or need to purchase components for a hardware device, e.g., if those components are exhausted, over utilized, obsolete, or otherwise in need of replacement or supplementation. If the button has not been selected, the process returns to step 206 to perform the normal functions for the displayed device information.

Once the supplies button is selected, then in step 210, the computer system 12 connects over the Internet 24 (or other network) to the store website appropriate for the hardware device 14 that has been selected in steps 204, and collected device information is sent from the computer system 12 to the store website over the network. The device information is or was collected, in one preferred embodiment, by operating system 29 running on computer system 12. The operating system can, for example, query hardware devices connected to the computer system 12 (or otherwise in communication with the operating system) for device information, such as device identification data. In some embodiments, device information can be collected after the user is determined in step 208 to have selected the buy supplies option. Or, each hardware device can provide the operating system with its device information (e.g., using a driver program) at any previous time, to be collected by the operating system. In some embodiments, the operating system can collect all device information prior to the execution of method 200 or step 208 and store the device information for ready availability (and update the collected device information periodically if needed). In still other embodiments, device information is collected in other ways.

The device information includes identification information that indicates to the website the identity of the hardware device 14 selected by the user for which the user wishes to buy components. In one embodiment, this identification information is a device driver string obtained from the driver program running on the computer system 12 and allowing control of the selected hardware device 14. Other types of device identification information can be sent in other embodiments. For example, in an alternate embodiment, the computer system 12 may have previously received all the database hardware device information from the server 22, and can identify the particular model or series of the hardware device by matching to the database information stored locally, and can send that identification to the server 22 so that the server does not have to perform any matching or identification (described with reference to FIG. 5).

In some embodiments, the device information can include additional information that is sent to the store website, such as status information indicating the current status of particular existing components of the selected hardware device. For example, the status information can include values indicating the current ink level of existing ink cartridges or the current toner level of an existing toner cartridge of the hardware device, a value indicating a current battery power level for the hardware device, etc. For example, the device information can include, for each ink cartridge of a printer device, a cartridge string that identifies the type of cartridge (e.g., by its color of ink and its compatible hardware device), and status information including an associated value that indicates the percentage of ink left in that cartridge.

The computer system 12 sends the device information to the server 22. In one embodiment, step 210 is performed via a URL sent to the browser on computer system 12. The store website is provided from a server 22 as described above with respect to FIG. 1.

In step 212, the computer system 12 runs a browser program or other program that allows the display of store website information that is received from the server 22 in response to the request to buy components. The browser displays the store web page to offer compatible components for the hardware device selected by the user in step 204. The process is then complete at 214. The user may select desired components from the store website for purchase, as described above with respect to FIG. 3. In other embodiments, other application programs can display the component purchase information, such as a word processor, etc.

In some cases, the store website or server program may not be able to identify the hardware device, and can then send an indication to computer system 12 to display a list of devices from which the user can identify the desired hardware device (and/or the server can indicate which devices to display and/or highlight); or if only a partial identification is made, e.g., of the manufacturer, that can be displayed and allow the user to select the particular model or series. The computer system 12 can display a standard chooser list of devices, as described in greater detail with respect to FIG. 5. Once the user identifies the desired hardware device, the computer system 12 sends a description. The application provided by server 22 on computer system 12 records the hardware device identified by the user, which the server then associates with the previously received device information (explained in greater detail with respect to FIG. 5). (The server is made aware of the user's selection through the interface it provides). Similarly, if the user desires to change the selection of the hardware device that is associated with the displayed store components (e.g., by selecting the link 153 as shown in FIG. 3), then the computer system 12 can similarly display a list of devices from which the user can choose.

In another embodiment, the store website is not received from the server 22 upon selection of the supplies button as in steps 210-212, but instead the computer system 12 displays component purchase information based on previously-received data from server 22. For example, before the user selects a function in step 204, the computer system received and locally stored "database information" from the server 22 which indicates hardware device information and/or component purchase information. This database information allows the computer system 12 to present the compatible component purchase information without having to immediately receive a web page from the server, and can instead access local storage devices to display the component purchase information to the user. When the user selects one or more components for purchase, the computer system 12 can then send information to the server 22/website 26 indicating the components that were selected to be purchased.

For example, the server 22 can periodically send the computer system 12 all of its database information describing hardware devices (described with reference to FIG. 5) and all its component purchase information. In this way, the computer system 12 is continually updated with the latest device and store information. In another embodiment, the computer system 12 periodically sends the server 22 device information that identifies hardware devices (and components) of the computer system 12, and in response, the server periodically sends only a portion of its database information to be stored on the computer system 12, i.e., that database information which is related to and compatible with the hardware devices 14 of the computer system 12. If changes to the computer system 12 required that updated information is needed, then the method as described for FIG. 4 can be used.

Figure 5:
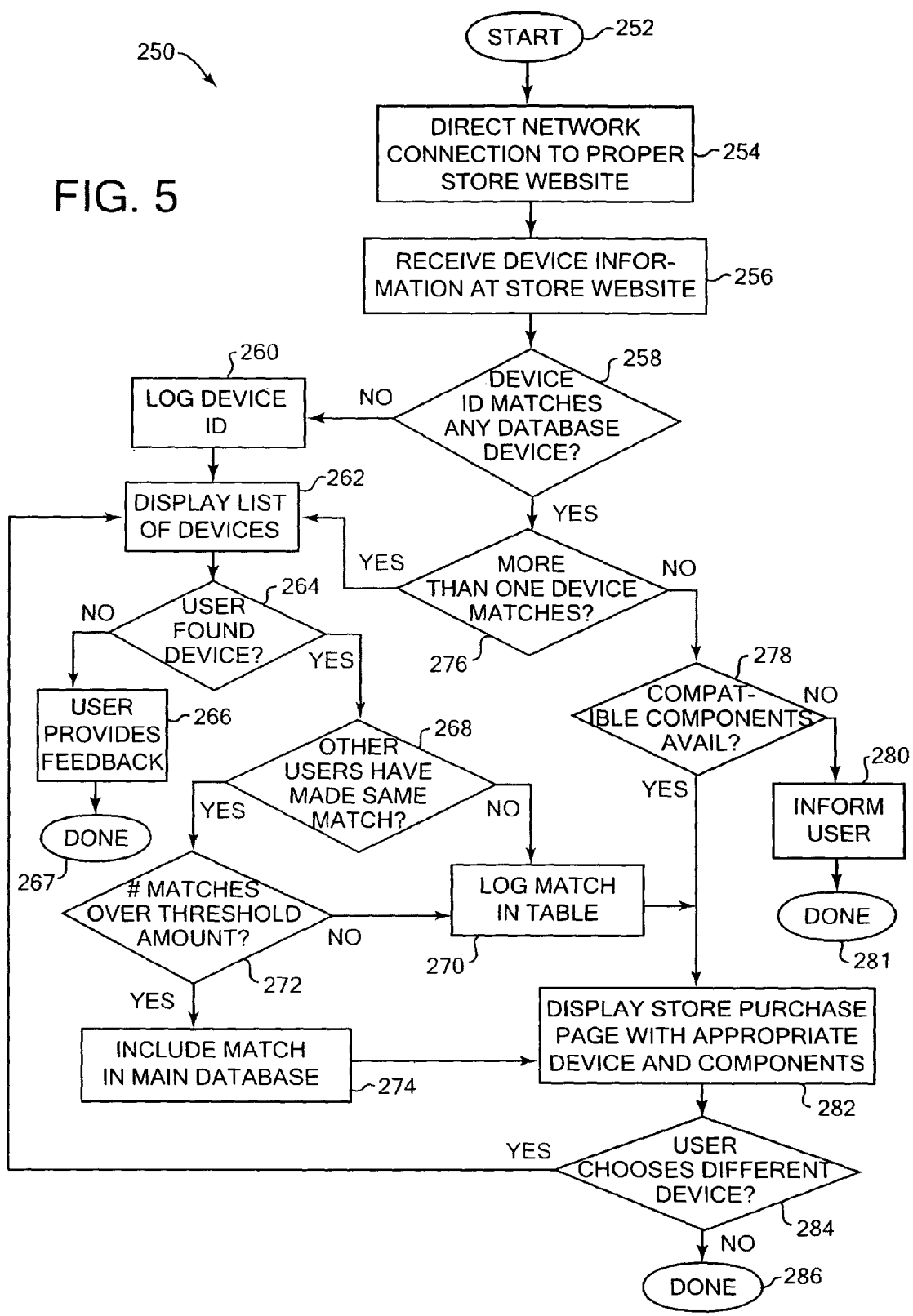
FIG. 5 is a flow diagram illustrating a method of the present invention for providing a store website providing compatible components compatible with the user's hardware device.

FIG. 5 is a flow diagram illustrating a method 250 of the present invention for providing a store website providing components compatible with a hardware device connected to the computer system of the user. Method 250 is implemented by program instructions of a server program running on server 22 that provides the store website 26 (or on a system connected to the server 22 running the website). In alternate embodiments, method 250 can be run using hardware using logic gates, circuitry, etc., or a combination of software and hardware. Program instructions for method 250 can be stored on a computer readable medium, such as memory, hard drive, other magnetic disk, optical disk (CD-ROM, DVD-ROM), etc.

Method 250 begins at 252, and in step 254, the server 22 directs the network connection of the computer system 12 to the proper store website. In some embodiments, this step simply causes the store website at the server 22 receiving the connection to be sent to the computer system 12. In other embodiments, the computer system 12 first connects to a server site that provides redirection capability to a site appropriate to the location of the computer system 12. For example, a redirector application on a server can check if an online store exists for and services the location of the computer system 12 (e.g., country or region), and/or the language used on the computer system 12, and if not, inform the user of this condition. If an online store does service that location and/or language, then the computer 12 can be directed to the store website for that location that is appropriate to the language of the connection request from the client computer. A method for redirecting client computers to sites appropriate to country/location and language is described in copending U.S. patent application Ser. No. 11/016,673, filed Dec. 16, 2004, entitled "Automated Estimation of a Country Where a Client Computer is Configured to Operate," which is incorporated herein by reference in its entirety, and can be used for the present invention to direct the computer system 12 to the proper website, for example. In other embodiments, the computer system 12 can be redirected to a website store based on other characteristics or associations of the computer system 12 or user.

In step 256, the device information sent from the computer system 12 is received at the store website 26. As described above with reference to FIG. 4, the computer system 12 sends device information including a device identification for the hardware device the user has selected for which to buy supplies. This device identification can be a device driver string, for example. In alternate embodiments, the device identification can be a Universal Serial Bus identification or other USB-level strings, or a product string from a Postscript printer description file, etc. In some embodiments, additional device information is also sent, such as status information for components of the selected hardware device, e.g., ink levels for identified cartridges, battery levels, etc.

In step 258, the process checks whether the device identification received in step 256 matches the information for any devices stored in the main device database accessible to the store website/server 22. The main database, which can be provided on server 22 or another connected computer or storage device, includes information identifying a large number of hardware devices that are available to users and continuously is updated by store operators as new hardware devices are released. For some hardware devices, the device identification received from the computer system identifies a particular manufacturer, series, and model, while for other devices, the identification may only identify a manufacturer or series of devices. Thus, for some types of hardware devices like printer devices, either the model name or the series name could match in step 258. Furthermore, if status information for device components has also been sent (including identifications of particular components, like color of ink cartridge), then the process also tries to match the component identification information with information for components in the database.

In some instances, the received device identification may not match any devices stored in the device database. This may occur, for example, if updates have not yet been made to the database, if particular hardware devices were missed when last updating the database, if the user/customer is using an obsolete or outdated hardware device that was not input to the database, or for other similar reasons. If no match is found, the process continues to step 260, in which the received device identification is logged in a list holding all the non-matched device identifications received at the store web site from computer systems that have tried to access the store. This list of non-matching device identifications can, for example, periodically be sent to an administrator of the store website so that the database can be updated.

In next step 262, the server/store website causes the display of a list of hardware devices from which the user can choose the desired device. For example, the list can be displayed to the user in a web browser of the system 12 via an application on server 22. In other embodiments, the list can be displayed via a word processor or other application on the computer system 12. For example, if database information were previously sent to the computer system 12 from the server 22 (e.g., periodically), the client can display the list for the user and determine the identification. Preferably, only those hardware devices are included in the list for which the store website offers supplies or accessories. This list can be in any of many possible formats. In the described embodiment, the list can be presented as a standard "chooser/finder" list that is typically used within the operating system on the computer system 12.

Figure 6:
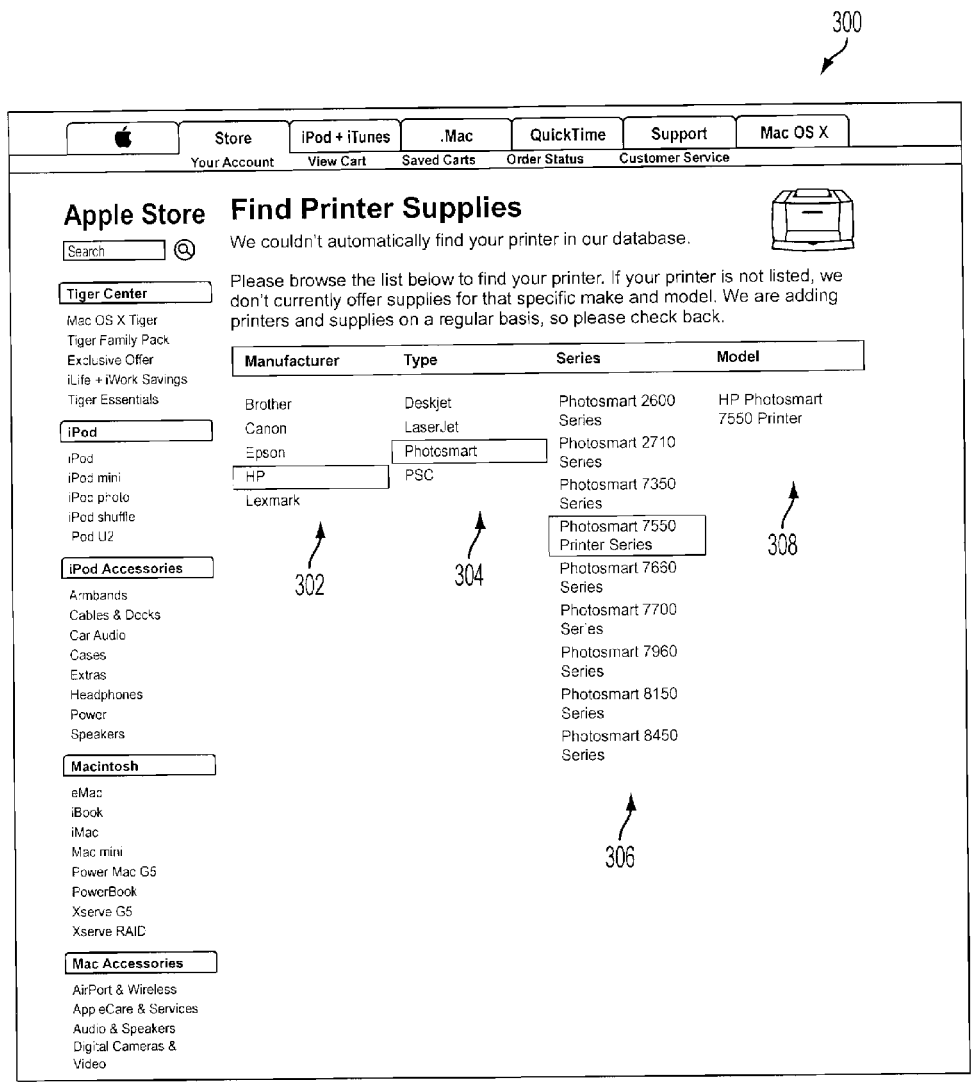
FIG. 6 is a diagrammatic illustration of one example of a list from which the user can select a hardware device.

FIG. 6 is a diagrammatic illustration of one example 300 of a "chooser" type of list from which the user can select a printer device. The user can first select a manufacturer of printer devices from menu 302, which narrows down the list of possible selections in the next menu 304. Menu 304 displays the types of printer devices available for the selected manufacturer in menu 302. The user selects one of the types of printers, which narrows down selections in menu 306 for series of printers, which in turn narrows down the selections in menu 308 for the model numbers. In some cases, the manufacturer name (and/or other information) can be identified from the device identification received in step 256, but no additional information about the device can be determined (e.g., if a new driver has been released by the manufacturer that changes the format of part of the device driver string). In such a case, the determined manufacturer (or other information) can be automatically selected and highlighted for the user so that the user need only select the remaining details for the hardware device.

Returning to FIG. 5, in step 264, the process checks whether the user has found the desired device, i.e., selected a device from the list displayed in step 262. If not, the user can provide feedback in step 266 to indicate the details of the hardware device which was not included in the list, and this feedback can be later processed by the administrator of the store website. The process is then complete at 267, and the user is not able to buy supplies for the hardware device. Optionally, a generic store website can be presented and displayed to allow purchases of items by the user, but this website is not tailored for any specific hardware device of the user.

If the user did find the desired hardware device in the list in step 264, then in step 268 the process checks whether previous users of the website (or previous users purchasing components who can be logged and tracked, e.g., within an organization running several stores or servers) and the list have made the same match, i.e., have selected the same hardware device from the list of step 262 and that selected device is associated with the same device identification as received in step 256. Previous matches made by other users can be compared to entries in a customer driven table on the server that stores the previous matches. If other users have not made the same match, then in step 270 the process logs the match (device identification associated with selected hardware device) in the customer driven table. For example, the particular device identification (e.g., device driver string) received in step 256 and the selected hardware device from the list of step 262 are stored as a match in the customer driven table. Additional information can also be stored if desired, such as the date or time that the match was made, etc. The process then continues to step 282 to display the store website to the user as tailored to the hardware device selected by the user from list 262, as described in detail below.

If other users have made the same match, as checked in step 268, then the process continues to step 272, where the process checks whether the total number of these matches, including the match the user just made, is over a predetermined threshold amount of matches. The total number of matches is determined by adding the current match to the number of previous same matches stored in the customer driven table. If not over the threshold, then the process continues to step 270 to log the device identification match in the customer driven table as described above, and the process then continues to step 282 to display the store website as described below. If the number of matches is over the threshold amount in step 272, then in step 274, the match is written to the main device database as a mapping that is initially checked at step 258. Thus, if the threshold amount of matches has occurred, it indicates that customers have associated the received device identification with a particular hardware device enough times so that this association can be relied upon for all future customers providing that same device identification, and thus this mapping can be added to the main database. In addition, in step 274 the corresponding match entries in the customer driven table are flagged or otherwise designated as having been moved to the main database. The process then continues to step 282 to display the store webpage as described below. The process of steps 262-274 can also be implemented for component identification information (e.g., received as status information) that does not match any database information.

In other embodiments, other methods besides the threshold technique above can be used to determine whether a match should be included in the main database. For example, "velocity" (the matches per time interval) can be used or included in the determination, and/or methods to compute a confidence interval for the matches to weed out even distributions across a number of user selections.

Returning to step 258, if the received device identification matches one or more devices in the main database, then the process continues to step 276, in which the process checks whether there was more than one match found in step 258. This could occur, for example, if the device identification matched multiple hardware device models in the same series. If so, then the process continues to step 262 to display a list of devices (e.g. model numbers) from which the user can choose the desired hardware device, similarly as explained above for step 262. In this instance, the server 22 can highlight one of the matched manufacturers, types, etc., to help the user. If the user selects a hardware device from the list, then the steps 264-274 can be performed as described above. In addition, the server can display all the matched hardware devices as links above the list of devices, so that if the user selects one of these links, the associated hardware device will be considered to have been matched and selected. If this occurs, then the process can go to step 282 to display the store website for the selected hardware device.

Additionally, if the device identification matches multiple hardware device models in the same series in step 276, then the process can check if the purchasable components for all the models are the same. If all models have the same purchasable components, then the process can continue to step 278, and the component purchase information displayed in step 282 lists all the device model names instead of just one device model name. If the components are not same for all the models, then step 262 is initiated as shown.

If there is only a single device from the database that matches the received device identification in step 276, then the process continues to step 278, where it is checked whether there are compatible components available to be purchased at the store for the matched hardware device. If there are no compatible components, then the user is informed of this at step 280, and the process is complete at 281. Optionally, an additional check can be made after step 280 to determine if supplies for the hardware device will ever be sold at the store website at a future date. For example, a list of devices can be maintained in a table for which supplies will never be sold, e.g., because the devices are too old and outdated to be supported. If the matched, unsupplied device is not on that table, then the administrator can be informed of the user's interest so that components can be eventually added to the store for that device, if appropriate. However, if the matched device is on that table and will never be supported, then the user can be presented with a different option, e.g., a generic store can be displayed, or a suggestion to buy a new, updated, and equivalent hardware device from the store.

If compatible components are available in step 278, then the process continues to step 282, in which the store purchase page is provided to the computer system 12 over the internet or other network so that it is displayed for the user with the appropriate device indicated and with compatible components listed for the hardware device. The server/store website matches the hardware device to all the compatible components for that device carried in the inventory of the store. The components considered "compatible" for each hardware device can be pre-designated as such, and continuously updated, by the store operators. The component purchase information for each compatible component is provided to be displayed to the user on the computer system 12, e.g., by display device 17. In one example, component purchase information for a printer device can be displayed similarly as in the example web page 150 shown in FIG. 3. Optionally, one or more generic components can additionally be displayed which are compatible with the type of the matched hardware device, e.g., generic paper supplies can be displayed for any printer device.

In some embodiments, the user can also be offered the option to select a different hardware device for which to display compatible components, e.g., a link 153 as shown in FIG. 3. This may be needed, for example, if the wrong hardware device was matched to the user's device identification, or if the user changes his or her mind about the hardware device for which to buy components. Thus, in step 284, the process checks whether the user chooses a different device for which to offer supplies. If so, then the process continues to step 262 to offer the user the list of devices from which to select, similarly as described above. If the user does not choose another device, the process is complete at 286. The user can select quantities of compatible components as desired using the store website and purchase the selected components.

As described above, in a different embodiment, the server 22 previously provided its database information to the computer system 12, or portion of the database information that is pertinent to the hardware devices and components of the computer system. This would allow the computer system 12, instead of the server 22, to perform the matching of device information to hardware devices, the listing of devices for the user to choose, the displaying of component purchase information, etc., in a similar manner to that of the method of FIG. 5. The server 22 would implement the actual purchase of the components for the user once the computer system 12 sent the server 22 information indicating which components had been selected for purchase by the user.

The present invention allows a user to quickly and conveniently purchase components compatible with hardware devices of that user's computer system, with a minimum of hassle. Furthermore, the present invention can provide helpful information to assist the user in deciding when and what to purchase. The present invention can also automatically identify hardware devices and use techniques such as the accumulation of relationships between hardware devices, device information, and components to offer more accurate identifications and more appropriate components for particular devices. The present invention can also be very helpful to product manufacturers and vendors. For example, the patterns of component purchasing in one market or country can be logged with the present invention and applied to other new markets or areas.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing the purchase of components for a hardware device using a computer system, the method comprising:
   using an operating system on the computer system to automatically determine the identity of a hardware device coupled to the computer system and in communication with the operating system;
   analyzing actual rate of use by a user, at the computer system, to make a prediction of when replacement or supplementary hardware device components will be needed prior to needing the replacement or supplementary hardware device components;
   responsive to the analysis, communicating over a network to receive current purchasing information from a server at the computer system related to the hardware device; and
   selecting by the computer system based on user input a purchase option on the computer system of at least one component for the hardware device based on the identity of the hardware device provided and displayed by the operating system, such that a user can select the at least one component for purchase, wherein the at least one component is compatible with and for use with the hardware device.

2. The method of claim 1 wherein the purchase option provided by the operating system is independent of a driver program for the hardware device.

3. The method of claim 1 wherein the identity of the hardware device is determined using device information identifying and provided from the hardware device.

4. The method of claim 1 wherein the operating system collects device information from the hardware device and sends the device information to a server over a network, and wherein the server determines the identity of the hardware device based on the device information.

5. The method of claim 1 further comprising receiving database information at the computer system from a server over a network, and wherein the identity of the hardware device is determined by the operating system by collecting device information from the hardware device and using the received database information.

6. The method of claim 1 further comprising receiving a purchase selection from the user for at least one of the displayed components and sending the purchase selection to the server using the operating system.

7. The method of claim 4 further comprising:
   receiving a selection from a user in the operating system of the computer system, the selection related to the hardware device; and
   displaying a control after receiving the selection related to the hardware device, wherein the sending of the device information occurs when the user has selected the control.

8. The method of claim 3 wherein the device information includes information for identifying the hardware device and for identifying at least one existing component of the hardware device.

9. The method of claim 8 wherein the device information includes status information indicating a current status of at least one existing component of the hardware device.

10. The method of claim 9 wherein the displaying of the at least one component for purchase includes displaying the current status of the at least one existing component of the hardware device.

11. The method of claim 10 wherein at least one existing component of the hardware device and its current status are identified from the received device information,
   wherein information in the device information is matched with database information to identify the at least one existing component.

12. The method of claim 7 further comprising displaying status information displayed with the control responsive to the current status level of the associated component being below a predetermined threshold level, the status information indicating to the user a current status of at least one existing component of the hardware device.

13. The method of claim 9 further comprising displaying a warning to the user responsive to a current supply level of a component of the hardware device being below a predetermined threshold level.

14. The method of claim 13 wherein displaying the warning includes designating or highlighting a control used by the user to select the purchase option.

15. The method of claim 14 wherein the warning is displayed based on prior user behavior or prior use of the component or the hardware device.

16. The method of claim 3 further comprising displaying a list of devices on the computer system such that the user can identify the hardware device by selecting one or more options from the list responsive to failing to identify the hardware device from the device information.

17. The method of claim 3 wherein responsive to the device information not matching any information for hardware devices in the database, the administrator of the server being provided with an indication that the device information was not matched.

18. The method of claim 9 wherein the existing component is a refillable component, replaceable mechanism, or consumable component of the hardware device.

19. The method of claim 9 wherein the hardware device is a device having at least one battery, and wherein the status information includes an indication of the remaining number of charges available for the at least one battery.

20. The method of claim 1 wherein the hardware device is a motherboard of the computer system.

21. The method of claim 18 wherein the consumable component is memory.

22. A computer-implemented method for allowing the purchase of components for a hardware device, the method comprising:
   receiving a selection from a user, at a computer system, of a purchase option control displayed in an operating system running on a computer system, the purchase option based on the computer system analyzing an actual rate of use by a user to make a prediction of when replacement or supplementary hardware device components will be needed prior to needing the replacement or supplementary hardware device components;
   using the identity of a hardware device coupled to the computer system and in communication with the operating system to receive current purchasing information at the computer system related to the hardware device, wherein the identity of the hardware device is determined based on device information collected by the operating system from the hardware device;

selecting by the computer system based on user input the purchase option on the computer system of at least one component for the hardware device based on the identity of the hardware device provided and displayed by the operating system, such that a user can select and purchase the at least one component, wherein the at least one component is compatible with and for use with the hardware device; and determining by the computer system based on prior user behavior or prior use of the hardware device an estimated time when the at least one component will need replacement.

23. The computer-implemented method of claim 22 wherein the identity of the hardware device is determined using device information identifying and provided from the hardware device.

24. The computer-implemented method of claim 22 wherein the operating system collects device information from the hardware device and sends the device information to a server over a network, and wherein the server determines the identity of the hardware device based on the device information and provides the current purchasing information to the computer system.

25. The computer-implemented method of claim 22 further comprising receiving database information at the computer system from a server over a network, and wherein the identity of the hardware device is determined by the operating system by collecting device information from the hardware device and using the received database information.

26. The computer-implemented method of claim 22 wherein the computer system receives the current purchasing information over a network from a server.

27. The computer-implemented method of claim 22 further comprising receiving a purchase selection from the user for at least one of the displayed components and sending the purchase selection to a server using the operating system.

28. The computer-implemented method of claim 25 further comprising:

receiving a selection from a user in the operating system of the computer system, the selection related to the hardware device; and displaying a control after receiving the selection related to the hardware device, wherein the sending of the device information occurs when the user has selected the control.

29. The computer-implemented method of claim 23 wherein the device information includes device identification information for identifying the hardware device and status information indicating a current status of at least one existing component of the hardware device.

30. The computer-implemented method of claim 29 wherein the displaying of the at least one component for purchase includes displaying the current status of the at least one existing component of the hardware device.

31. The computer-implemented method of claim 28 further comprising displaying status information displayed with the control if the current status level of the associated component is below a threshold level, the status information indicating to the user a current status of at least one existing component of the hardware device.

32. The computer-implemented method of claim 22 further comprising displaying a warning to the user if a current supply level of a component of the hardware device is below a threshold level.

33. The computer-implemented method of claim 32 wherein displaying the warning includes changing the color of a button used by the user to select the purchase option.

34. The computer-implemented method of claim 32 wherein the warning is displayed based on prior user behavior prior use of the component or the hardware device.

35. The computer-implemented method of claim 22 wherein a time in the future estimated to be when the at least one component will need replacement is also displayed to the user, wherein the estimation is based on prior user behavior or prior use of the hardware device.

36. The computer-implemented method of claim 29 wherein the existing component is a refillable component, replaceable mechanism, or consumable component of the hardware device.

37. The computer-implemented method of claim 29 wherein the hardware device is a device having at least one battery, and wherein the status information includes an indication of the remaining number of charges available for the at least one battery.

38. The computer-implemented method of claim 36 wherein the consumable component is memory.

39. A non-transitory computer readable medium including program instructions for allowing the purchase of components for a hardware device using a computer system, the program instructions for performing a method comprising:

using an operating system on the computer system to automatically determine the identity of a hardware device coupled to the computer system and in communication with the operating system;

analyzing actual rate of use by a user, at the computer system, to make a prediction of when replacement or supplementary hardware device components will be needed prior to needing the replacement or supplementary hardware device components;

responsive to the analysis, communicating over a network to receive current purchasing information from a server at the computer system related to the hardware device;

selecting by the computer system based on user input a purchase option on the computer system of at least one component for the hardware device based on the identity of the hardware device provided and displayed by the operating system, such that a user can select the at least one component for purchase, wherein the at least one component is compatible with and for use with the hardware device; and determining by the computer system based on prior user behavior or prior use of the hardware device an estimated time when the at least one component will need replacement.

40. The method of claim 1, wherein the at least one component is automatically purchased based on user purchase preferences.

41. The method of claim 1, wherein the at least one component is automatically purchased based on a purchasing schedule selected by the user, wherein the purchasing schedule is based on prior user behavior or prior use of the hardware device.

42. The method of claim 1, wherein the actual rate of use by a user is an average rate of use of the replacement or supplementary hardware device components.

43. The method of claim 1, further comprising:
displaying an estimated date of when the replacement or supplementary hardware device components will be needed based on the prediction.

44. The method of claim 1, further comprising:
displaying an alert when a supply of the components is predicted to last less than a determined period.

45. The method of claim 1, wherein a supply level of the component is displayed proximate to the purchase option.

46. The method of claim 1, wherein a warning indicator is presented proximate to the purchase option when a supply level of the component is below a threshold.

47. The method of claim 1, wherein additional components for the hardware device are displayed and offered for purchase along with the at least one component needing replacement.

* * * * *